US012777014B2

(12) United States Patent
MacKinnon et al.

(10) Patent No.: US 12,777,014 B2
(45) Date of Patent: Oct. 27, 2026

(54) REUSABLE MAIL BLOCK GENERATION AND SUGGESTION

(71) Applicant: Notion Labs, Inc., San Francisco, CA (US)

(72) Inventors: Elias McKay MacKinnon, San Francisco, CA (US); Peter Lu, San Francisco, CA (US); Arpeet Kale, San Jose, CA (US)

(73) Assignee: Notion Labs, Inc., San Francisco, CA (US)

( * ) Notice: Subject to any disclaimer, the term of this patent is extended or adjusted under 35 U.S.C. 154(b) by 0 days.

(21) Appl. No.: 19/091,570

(22) Filed: Mar. 26, 2025

(65) Prior Publication Data

US 2026/0113294 A1 Apr. 23, 2026

Related U.S. Application Data

(60) Provisional application No. 63/708,667, filed on Oct. 17, 2024.

(51) Int. Cl.

*G06F 15/16* (2006.01)
*G06F 9/54* (2006.01)

(Continued)

(52) U.S. Cl.

CPC .......... *H04L 51/42* (2022.05); *G06F 21/6218* (2013.01); *G06F 40/30* (2020.01)

(58) Field of Classification Search

CPC ..... H04L 51/42; G06F 21/6218; G06F 40/30; G06F 40/131; G06F 40/166;

(Continued)

(56) References Cited

U.S. PATENT DOCUMENTS

| | | | |
|---|---|---|---|
| 6,732,155 | B2 | 5/2004 | Meek |
| 7,219,302 | B1 | 5/2007 | Oshaughnessy et al. |

(Continued)

FOREIGN PATENT DOCUMENTS

| | | | | |
|---|---|---|---|---|
| CN | 1588414 A | 3/2005 | | |
| CN | 106649557 A * | 5/2017 | ............ | G06F 40/30 |

(Continued)

OTHER PUBLICATIONS

ISA, International Search Report for International Application No. PCT/US2024/036178, mailed on Oct. 23, 2024, 6 pages.

*Primary Examiner* — Hamza N Algibhah

(74) *Attorney, Agent, or Firm* — Dorsey & Whitney LLP; Lena Petrovic; Anni Siitonen

(57) ABSTRACT

The present disclosure provides systems and methods for generating reusable mail blocks based on recurring patterns of text in groups of stored emails and suggesting relevant mail blocks to a user during email composition. Emails are stored in a database and similarity scores between emails are calculated based on semantic similarities. Emails with a similarity score satisfying a predetermined threshold are grouped together. Recurring text patterns within grouped emails are recognized to generate mail blocks containing generalized text. Text input by a user in an email composer is monitored for similarities with existing mail blocks. When a similarity is detected, insertion of a relevant mail block is suggested to the user.

20 Claims, 8 Drawing Sheets

(51) Int. Cl.
*G06F 21/62* (2013.01)
*G06F 40/30* (2020.01)
*H04L 29/06* (2006.01)
*H04L 51/42* (2022.01)

(58) Field of Classification Search
CPC .... G06F 40/186; G06F 40/216; G06F 40/274; G06F 40/279; G06F 40/284; G06F 40/56
USPC .......................................................... 709/206
See application file for complete search history.

(56) References Cited

U.S. PATENT DOCUMENTS 7,380,212 B2 * 5/2008 Cody ................... G06Q 10/107 715/752
7,413,085 B2 8/2008 Zager et al.
8,275,781 B2 * 9/2012 Fume ...................... G06F 16/93 715/256
8,392,409 B1 3/2013 Kashyap et al.
8,392,511 B2 * 3/2013 Chakra ................ G06Q 10/107 709/224
9,647,975 B1 * 5/2017 Dedenok ............... H04L 51/212
10,375,003 B1 8/2019 Olsen et al.
10,803,308 B2 * 10/2020 Yamamichi ............. G06T 11/60
11,138,174 B2 10/2021 Semenov
11,162,071 B2 11/2021 Loose et al.
11,526,779 B2 12/2022 Bringsjord et al.
11,546,281 B1 1/2023 Brown
11,777,892 B1 10/2023 Sen et al.
11,947,902 B1 4/2024 Grimshaw et al.
2002/0138581 A1 9/2002 Macintosh et al.
2003/0093483 A1 5/2003 Allen et al.
2003/0135565 A1 7/2003 Estrada
2003/0233419 A1 12/2003 Beringer
2004/0260718 A1 12/2004 Fedorov
2005/0043015 A1 2/2005 Muramatsu
2005/0257159 A1 11/2005 Keohane et al.
2005/0267944 A1 12/2005 Little
2006/0072723 A1 4/2006 Chung
2006/0080278 A1 4/2006 Neiditsch et al.
2006/0150151 A1 * 7/2006 Dubinsky ........... G06F 16/9558 717/114
2006/0155810 A1 7/2006 Butcher
2006/0248155 A1 11/2006 Bondarenko et al.
2007/0061400 A1 3/2007 Parsons
2008/0046518 A1 2/2008 Tonnison et al.
2008/0133501 A1 6/2008 Andersen et al.
2008/0147818 A1 6/2008 Sabo
2008/0183824 A1 7/2008 Chen et al.
2008/0235335 A1 9/2008 Hintermeister et al.
2008/0276171 A1 11/2008 Sabo
2010/0271365 A1 10/2010 Smith et al.
2011/0119258 A1 5/2011 Forutanpour et al.
2011/0258193 A1 * 10/2011 Brdiczka ............... G06F 40/216 707/E17.046
2012/0215866 A1 8/2012 Satterfield et al.
2012/0221961 A1 8/2012 Reynolds
2012/0297300 A1 11/2012 Mahoney et al.
2013/0191759 A1 * 7/2013 Bhogal ................... G06F 3/048 715/752
2013/0227454 A1 8/2013 Thorsander et al.
2015/0012208 A1 1/2015 Abrams
2015/0039566 A1 2/2015 Baumann et al.
2015/0088784 A1 3/2015 Dhara et al.
2015/0195232 A1 7/2015 Haugen et al.
2015/0248429 A1 9/2015 Pregueiro et al.
2015/0339373 A1 11/2015 Carlson et al.
2016/0011757 A1 1/2016 Hoffman
2016/0119260 A1 4/2016 Ghafourifar et al.
2017/0031770 A1 2/2017 Breedvelt-schouten et al.
2017/0365021 A1 * 12/2017 Stading ................ G06Q 50/184
2018/0040303 A1 2/2018 Lin et al.
2018/0091613 A1 3/2018 Goel et al.
2018/0113585 A1 4/2018 Shah
2018/0181378 A1 6/2018 Bakman
2018/0232441 A1 8/2018 Lin et al.
2019/0146650 A1 5/2019 Shah
2019/0187874 A1 6/2019 Canfield et al.
2019/0236621 A1 * 8/2019 Liu ...................... G06Q 10/107
2020/0026352 A1 1/2020 Wang et al.
2020/0053208 A1 2/2020 Kats et al.
2020/0210955 A1 * 7/2020 Bar-on .................... G06F 40/35
2020/0236081 A1 7/2020 Lukas et al.
2020/0372117 A1 * 11/2020 Han .................... G06F 16/9535
2020/0389420 A1 * 12/2020 Andres ................. H04L 51/063
2021/0342785 A1 11/2021 Mann et al.
2022/0044321 A1 2/2022 Monahan et al.
2022/0158962 A1 5/2022 Antonov et al.
2022/0236857 A1 7/2022 Sharifi et al.
2022/0263822 A1 8/2022 Zager et al.
2022/0377041 A1 11/2022 Lukas et al.
2022/0394005 A1 12/2022 Mehta et al.
2024/0020481 A1 * 1/2024 Brooks ................... G06F 40/30
2024/0106854 A1 * 3/2024 Dedenok ............... H04L 63/145
2025/0053735 A1 2/2025 Shevchenko et al.
2025/0077797 A1 * 3/2025 Sebby ..................... G06F 40/40
2025/0117586 A1 * 4/2025 Orbach ................... G06F 40/30
2025/0175694 A1 5/2025 Xu et al.
2025/0247352 A1 * 7/2025 Eftekhari ................ G06F 40/20
2025/0259013 A1 * 8/2025 Reinert ................. G06F 40/284
2025/0274407 A1 * 8/2025 Lambert ................. H04L 51/02
2025/0274409 A1 8/2025 Rieffel

FOREIGN PATENT DOCUMENTS

CN 109309612 B * 2/2022 ............. H04L 51/42
CN 120050255 A * 5/2025 ........... G06N 3/0895
CN 114611484 B * 7/2025 ............. G06F 18/25
DE 102005041369 B3 1/2007
EP 1464014 A1 10/2004
EP 1717743 A1 11/2006
EP 1774708 A1 4/2007
EP 2378476 A1 * 10/2011 ............. G06F 40/10
EP 2610812 B1 7/2015
EP 3261303 A1 * 12/2017 ............. G06F 16/35
FR 3026504 A1 4/2016
JP 2006350772 A 12/2006
KR 20060058903 A 6/2006
KR 20070057570 A 6/2007
WO 2007137323 A2 12/2007
WO WO-2016045502 A1 * 3/2016 ........... G06Q 10/107

* cited by examiner

REUSABLE MAIL BLOCK GENERATION AND SUGGESTION

CROSS-REFERENCE TO RELATED APPLICATION(S)

This application claims priority to and the benefits of U.S. Provisional Application No. 63/708,667, titled "CREATION AND SUGGESTION OF REUSABLE EMAIL MESSAGE COMPONENTS" filed on Oct. 17, 2024. The content of the aforementioned application is herein incorporated by reference in its entirety.

BACKGROUND

Electronic mail, or email, is a method of transmitting and receiving messages using electronic devices. Email is a ubiquitous and widely used communication medium often treated as a basic and necessary part of many processes in business, commerce, government, education, entertainment, and other spheres of daily life in most countries. Email operates across computer networks, primarily the internet, and also across local area networks. Today's email systems are based on a store-and-forward model. Email servers accept, forward, deliver, and store messages. Neither the users nor their computers are required to be online simultaneously; they need to connect, typically to a mail server or a webmail interface, to send, receive, or download messages.

BRIEF DESCRIPTION OF THE DRAWINGS

Reference will now be made, by way of example, to the accompanying drawings which show example embodiments of the present application, and in which.

Figure 1:
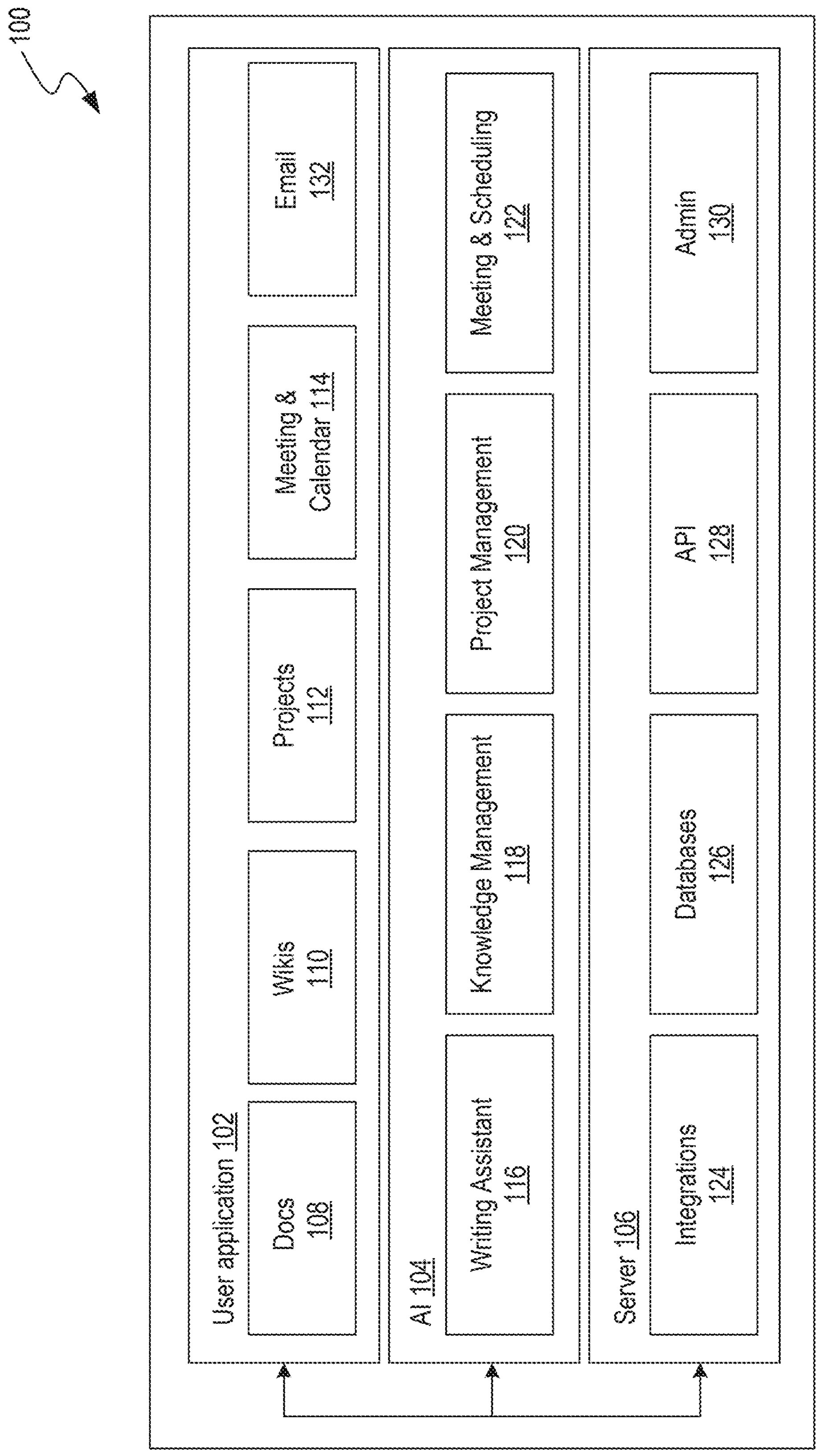
FIG. 1 is a block diagram illustrating a platform, which may be used to implement examples of the present disclosure.

The technologies described herein will become more apparent to those skilled in the art by studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The present technology provides for the generation of reusable email message components, or mail blocks, based on recurring patterns of text in groups of stored emails, and the suggestion of relevant mail blocks to a user during email composition. As the volume of emails exchanged only continues to grow, users often find themselves composing similar messages repeatedly. This repetitive task can be time-consuming and prone to errors, especially in professional contexts where consistency and accuracy are crucial. Traditional email systems typically offer basic composition aids such as templates or canned responses to address this issue. However, these solutions often lack flexibility and fail to provide relevant content to the nuanced context of a particular email conversation. Thus, users may find themselves spending considerable time modifying pre-written templates or searching through past emails to copy and paste relevant content.

Furthermore, additional existing email composition aids such as autofill/predictive text suggestion features often struggle to understand the semantic context of the email being written. This limitation can result in suggestions that are irrelevant or inappropriate for the specific communication at hand. These composition aids also often only suggest short strings of text at a time, ranging from a single word to no more than a sentence. As a result, users may need to repeatedly invoke these features until enough relevant suggestions are given, or they may need to ignore these features entirely, preferring to compose emails from scratch despite the inefficiency.

The present technology improves on the above limitations of existing email composition aids in at least three ways. First, the present technology enables repetitive portions of emails to be automatically filled in using mail blocks generated based on recognizing recurring patterns of text within groups of emails containing semantically similar content. Generating mail blocks in this way improves the relevancy of the text provided in the mail blocks to particular email contexts and results in the generation of mail blocks capturing more types of emails repeatedly sent by a user than existing solutions. Second, mail blocks are automatically suggested to a user before and/or during the composition of an email, reducing the time spent searching for relevant mail blocks, and a user reaction to a suggestion is incorporated into future suggestions, further improving the relevancy of suggestions over time. Third, mail blocks suggest more text at once than existing email composition aids, allowing emails to be efficiently composed while spending fewer computational resources on suggestion operations.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Block Data Model

The disclosed technology includes a block data model ("block model"). The blocks are dynamic units of information that can be transformed into other block types and move across workspaces. The block model allows users to customize how their information is moved, organized, and shared. Hence, blocks contain information but are not siloed.

Blocks are singular pieces that represent all units of information inside an editor. In one example, text, images, lists, a row in a database, etc., are all blocks in a workspace. The attributes of a block determine how that information is rendered and organized. Every block can have attributes including an identifier (ID), properties, and type. Each block is uniquely identifiable by its ID. The properties can include a data structure containing custom attributes about a specific block. An example of a property is "title," which stores text content of block types such as paragraphs, lists, and the title of a page. More elaborate block types require additional or different properties, such as a page block in a database with user-defined properties. Every block can have a type, which defines how a block is displayed and how the block's properties are interpreted.

A block has attributes that define its relationship with other blocks. For example, the attribute "content" is an array (or ordered set) of block IDs representing the content inside a block, such as nested bullet items in a bulleted list or the text inside a toggle. The attribute "parent" is the block ID of a block's parent, which can be used for permissions. Blocks can be combined with other blocks to track progress and hold all project information in one place.

A block type is what specifies how the block is rendered in a user interface (UI), and the block's properties and content are interpreted differently depending on that type. Changing the type of a block does not change the block's properties or content—it only changes the type attribute. The information is thus rendered differently or even ignored if the property is not used by that block type. Decoupling property storage from block type allows for efficient transformation and changes to rendering logic and is useful for collaboration.

Blocks can be nested inside of other blocks (e.g., infinitely nested sub-pages inside of pages). The content attribute of a block stores the array of block IDs (or pointers) referencing those nested blocks. Each block defines the position and order in which its content blocks are rendered. This hierarchical relationship between blocks and their render children are referred to herein as a "render tree." In one example, page blocks display their content in a new page, instead of rendering it indented in the current page. To see this content, a user would need to click into the new page.

In the block model, indentation is structural (e.g., reflects the structure of the render tree). In other words, when a user indents something, the user is manipulating relationships between blocks and their content, not just adding a style. For example, pressing Indent in a content block can add that block to the content of the nearest sibling block in the content tree.

Blocks can inherit permissions of blocks in which they are located (which are above them in the tree). Consider a page: to read its contents, a user must be able to read the blocks within that page. However, there are two reasons one cannot use the content array to build the permissions system. First, blocks are allowed to be referenced by multiple content arrays to simplify collaboration and a concurrency model. But because a block can be referenced in multiple places, it is ambiguous which block it would inherit permissions from. The second reason is mechanical. To implement permission checks for a block, one needs to look up the tree, getting that block's ancestors all the way up to the root of the tree (which is the workspace). Trying to find this ancestor path by searching through all blocks'content arrays is inefficient, especially on the client. Instead, the model uses an "upward pointer"—the parent attribute—for the permission system. The upward parent pointers and the downward content pointers mirror each other.

A block's life starts on the client. When a user takes an action in the interface—typing in the editor, dragging blocks around a page—these changes are expressed as operations that create or update a single record. The "records" refer to persisted data, such as blocks, users, workspaces, etc. Because many actions usually change more than one record, operations are batched into transactions that are committed (or rejected) by the server as a group.

Creating and updating blocks can be performed by, for example, pressing Enter on a keyboard. First, the client defines all the initial attributes of the block, generating a new unique ID, setting the appropriate block type (to_do), and filling in the block's properties (an empty title, and checked: [["No"]]). The client builds operations to represent the creation of a new block with those attributes. New blocks are not created in isolation: blocks are also added to their parent's content array, so they are in the correct position in the content tree. As such, the client also generates an operation to do so. All these individual change operations are grouped into a transaction. Then, the client applies the operations in the transaction to its local state. New block objects are created in memory and existing blocks are modified. In native apps, the model caches all records that are accessed locally in an LRU (least recently used) cache on top of SQLite or IndexedDB, referred to as RecordCache. When records are changed on a native app, the model also updates the local copies in RecordCache. The editor re-renders to draw the newly created block onto the display. At the same time, the transaction is saved into TransactionQueue, the part of the client responsible for sending all transactions to the model's servers so that the data is persisted and shared with collaborators. TransactionQueue stores transactions safely in IndexedDB or SQLite (depending on the platform) until they are persisted by the server or rejected.

A block can be saved on a server to be shared with others. Usually, TransactionQueue sits empty, so the transaction to create the block is sent to the server in an application programming interface (API) request. In one example, the transaction data is serialized to JSON and posted to the /saveTransactions API endpoint. SaveTransactions gets the data into source-of-truth databases, which store all block data as well as other kinds of persisted records. Once the request reaches the API server, all the blocks and parents involved in the transaction are loaded. This gives a "before" picture in memory. The block model duplicates the "before" data that had just been loaded in memory. Next, the block model applies the operations in the transaction to the new copy to create the "after" data. Then the model uses both "before" and "after" data to validate the changes for permissions and data coherency. If everything checks out, all created or changed records are committed to the database—meaning the block has now officially been created. At this point, a "success" HTTP response to the original API request is sent by the client. This confirms that the client knows the transaction was saved successfully and that it can move on to saving the next transaction in the TransactionQueue. In the background, the block model schedules additional work depending on the kind of change made for the transaction. For example, the block model can schedule version history snapshots and indexing block text for a Quick Find function. The block model also notifies MessageStore, which is a real-time updates service, about the changes that were made.

The block model provides real-time updates to, for example, almost instantaneously show new blocks to members of a teamspace. Every client can have a long-lived WebSocket connection to the MessageStore. When the client renders a block (or page, or any other kind of record), the client subscribes to changes of that record from MessageStore using the WebSocket connection. When a team member opens the same page, the member is subscribed to changes of all those blocks. After changes have been made through the saveTransactions process, the API notifies MessageStore of new recorded versions. MessageStore finds client connections subscribed to those changing records and passes on the new version through their WebSocket connection. When a team member's client receives version update notifications from MessageStore, it verifies that version of the block in its local cache. Because the versions from the notification and the local block are different, the client sends a syncRecordValues API request to the server with the list of outdated client records. The server responds with the new record data. The client uses this response data to update the local cache with the new version of the records, then re-renders the user interface to display the latest block data.

Blocks can be shared instantaneously with collaborators. In one example, a page is loaded using only local data. On the web, block data is pulled from being in memory. On native apps, loading blocks that are not in memory are loaded from the RecordCache persisted storage. However, if missing block data is needed, the data is requested from an API. The API method for loading the data for a page is referred to herein as loadPageChunk; it descends from a starting point (likely the block ID of a page block) down the content tree and returns the blocks in the content tree plus any dependent records needed to properly render those blocks. Several layers of caching for loadPageChunk are used, but in the worst case, this API might need to make multiple trips to the database as it recursively crawls down the tree to find blocks and their record dependencies. All data loaded by loadPageChunk is put into memory (and saved in the RecordCache if using the app). Once the data is in memory, the page is laid out and rendered using React.

Software Platform

FIG. 1 is a block diagram of an example platform 100. The platform 100 provides users with an all-in-one workspace for data and project management. The platform 100 can include a user application 102, an artificial intelligence (AI) tool 104, and a server 106. The user application 102, the AI tool 104, and the server 106 are in communication with each other via a network.

In some implementations, the user application 102 is a cross-platform software application configured to work on several computing platforms and web browsers. The user application 102 can include a variety of templates. A template refers to a prebuilt page that a user can add to a workspace within the user application 102. The templates can be directed to a variety of functions. Exemplary templates include a docs template 108, a wikis template 110, a projects template 112, a meeting and calendar template 114, and an email template 132. In some implementations, a user can generate, save, and share customized templates with other users.

The user application 102 templates can be based on content "blocks." For example, the templates of the user application 102 include a predefined and/or pre-organized set of blocks that can be customized by the user. Blocks are content containers within a template that can include text, images, objects, tables, maps, emails, and/or other pages (e.g., nested pages or sub-pages). Blocks can be assigned to certain properties. The blocks are defined by boundaries having dimensions. The boundaries can be visible or non-visible for users. For example, a block can be assigned as a text block (e.g., a block including text content), a heading block (e.g., a block including a heading), or a sub-heading block having a specific location and style to assist in organizing a page. A block can be assigned as a list block to include content in a list format. A block can be assigned as an AI prompt block (also referred to as a "prompt block") that enables a user to provide instructions (e.g., prompts) to the AI tool 104 to perform functions. A block can also be assigned to include audio, video, or image content.

A user can add, edit, and remove content from the blocks. The user can also organize the content within a page by moving the blocks around. In some implementations, the blocks are shared (e.g., by copying and pasting) between the different templates within a workspace. For example, a block embedded within multiple templates can be configured to show edits synchronously.

The docs template 108 is a document generation and organization tool that can be used for generating a variety of documents. For example, the docs template 108 can be used to generate pages that are easy to organize, navigate, and format. The wikis template 110 is a knowledge management application having features similar to the pages generated by the docs template 108 but that can additionally be used as a database. The wikis template 110 can include, for example, tags configured to categorize pages by topic and/or include an indication of whether the provided information is verified to indicate its accuracy and reliability. The projects template 112 is a project management and note-taking software tool. The projects template 112 can allow the users, either as individuals or as teams, to plan, manage, and execute projects in a single forum. The meeting and calendar template 114 is a tool for managing tasks and timelines. In addition to traditional calendar features, the meeting and calendar template 114 can include blocks for categorizing and prioritizing scheduled tasks, generating to-do and action item lists, tracking productivity, etc. The various templates of the user application 102 can be included under a single workspace and include synchronized blocks. For example, a user can update a project deadline on the projects template 112, which can be automatically synchronized to the meeting and calendar template 114. The various templates of the user application 102 can be shared within a team, allowing multiple users to modify and update the workspace concurrently.

The email template 132 allows the users to customize their inbox by representing the inbox as a customizable database where the user can add custom columns and create custom views with layouts. One view can include multiple layouts including a calendar layout, a summary layout, and an urgent information layout. Each view can include a customized structure including custom criteria, custom properties, and custom actions. The custom properties can be specific to a view such as AI-extracted properties and/or heuristic-based properties. The custom actions can trigger automatically when a message enters the view. The custom actions can include deterministic rules like "Archive this," or assistant workflows like responding to support messages by searching user applications 102 or filing support tickets. In addition, the view can include actions, such as buttons, that are custom to the view and perform operations on the messages in the inbox. Only the customized structure can be shared with other users of the system, or both the customized structure and the messages can be shared.

The integration of the docs template 108, the wikis template 110, the projects template 112, the meeting and calendar template 114, and the email template 132 enables linking and embedding of templates within other templates. For example, an email sent from an email address within the platform 100 to another email address within the platform 100 can include an embedding of a document within the platform 100, or an embedding of a block within the document. In another example, a wiki can link to a meeting within the calendar.

The AI tool 104 is an integrated AI assistant that enables AI-based functions for the user application 102. In one example, the AI tool 104 is based on a neural network architecture, such as the transformer 212 described in relation to FIG. 2. The AI tool 104 can interact with blocks embedded within the templates on a workspace of the user application 102. For example, the AI tool 104 can include a writing assistant tool 116, a knowledge management tool 118, a project management tool 120, and a meeting and scheduling tool 122. The different tools of the AI tool 104 can be interconnected and interact with different blocks and templates of the user application 102.

The writing assistant tool 116 can operate as a generative AI tool for creating content for the blocks in accordance with instructions received from a user. Creating the content can include, for example, summarizing, generating new text, or brainstorming ideas. For example, in response to a prompt received as a user input that instructs the AI to describe what the climate is like in New York, the writing assistant tool 116 can generate a block including text that describes the climate in New York. As another example, in response to a prompt that requests ideas on how to name a pet, the writing assistant tool 116 can generate a block including a list of creative pet names. The writing assistant tool 116 can also operate to modify existing text. For example, the writing assistant can shorten, lengthen, or translate existing text, correct grammar and typographical errors, or modify the style of the text (e.g., a social media style versus a formal style).

The knowledge management tool 118 can use AI to categorize, organize, and share knowledge included in the workspace. In some implementations, the knowledge management tool 118 can operate as a question-and-answer assistant. For example, a user can provide instructions on a prompt block to ask a question. In response to receiving the question, the knowledge management tool 118 can provide an answer to the question, for example, based on information included in the wikis template 110. The project management tool 120 can provide AI support for the projects template 112. The AI support can include autofilling information based on changes within the workspace or automatically tracking project development. For example, the project management tool 120 can use AI for task automation, data analysis, real-time monitoring of project development, allocation of resources, and/or risk mitigation. The meeting and scheduling tool 122 can use AI to organize meeting notes, unify meeting records, list key information from meeting minutes, and/or connect meeting notes with deliverable deadlines.

The server 106 can include various units (e.g., including compute and storage units) that enable the operations of the AI tool 104 and workspaces of the user application 102. The server 106 can include an integrations unit 124, an application programming interface (API) 128, databases 126, and an administration (admin) unit 130. The databases 126 are configured to store data associated with the blocks. The data associated with the blocks can include information about the content included in the blocks, the function associated with the blocks, and/or any other information related to the blocks. The API 128 can be configured to communicate the block data between the user application 102, the AI tool 104, and the databases 126. The API 128 can also be configured to communicate with remote server systems, such as AI systems. For example, when a user performs a transaction within a block of a template of the user application 102 (e.g., in a docs template 108), the API 128 processes the transaction and saves the changes associated with the transaction to the database 126. The integrations unit 124 is a tool connecting the platform 100 with external systems and software platforms. Such external systems and platforms can include other databases (e.g., cloud storage spaces), messaging software applications, or audio or video conference applications. The administration unit 130 is configured to manage and maintain the operations and tasks of the server 106. For example, the administration unit 130 can manage user accounts, data storage, security, performance monitoring, etc.

Transformer for Neural Network

To assist in understanding the present disclosure, some concepts relevant to neural networks and machine learning (ML) are discussed herein. Generally, a neural network comprises a number of computation units (sometimes referred to as "neurons"). Each neuron receives an input value and applies a function to the input to generate an output value. The function typically includes a parameter (also referred to as a "weight") whose value is learned through the process of training. A plurality of neurons may be organized into a neural network layer (or simply "layer") and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks and there may be more complex neural network designs that include feedback connections, skip connections, and/or other such possible connections between neurons and/or layers, which are not discussed in detail here.

A deep neural network (DNN) is a type of neural network having multiple layers and/or a large number of neurons. The term DNN can encompass any neural network having multiple layers, including convolutional neural networks (CNNs), recurrent neural networks (RNNs), multilayer perceptrons (MLPs), Generative Adversarial Networks (GANs), Variational Autoencoders (VAEs), and Auto-regressive Models, among others. Unlike discriminative models, generative models are distinguished by their ability to create new, synthetic data that closely resembles the training data. In contrast, discriminative models focus on predicting labels for given inputs.

DNNs are often used as ML-based models for modeling complex behaviors (e.g., human language, image recognition, object classification) in order to improve the accuracy of outputs (e.g., more accurate predictions) such as, for example, as compared with models with fewer layers. In the present disclosure, the term "ML-based model" or more simply "ML model" may be understood to refer to a DNN. Training an ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model.

As an example, to train an ML model that is intended to model human language (also referred to as a "language model"), the training dataset may be a collection of text documents, referred to as a "text corpus" (or simply referred to as a "corpus"). The corpus may represent a language domain (e.g., a single language), a subject domain (e.g., scientific papers), and/or may encompass another domain or domains, be they larger or smaller than a single language or subject domain. For example, a relatively large, multilingual, and non-subject-specific corpus can be created by extracting text from online webpages and/or publicly available social media posts. Training data can be annotated with ground truth labels (e.g., each data entry in the training dataset can be paired with a label) or may be unlabeled.

Training an ML model generally involves inputting into an ML model (e.g., an untrained ML model) training data to be processed by the ML model, processing the training data using the ML model, collecting the output generated by the ML model (e.g., based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding ML model input (e.g., in the case of an autoencoder), or can be a measure of some target observable effect on the environment (e.g., in the case of a reinforcement learning agent). The parameters of the ML model are updated based on a difference between the generated output value and the desired target value. For example, if the value outputted by the ML model is excessively high, the parameters may be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the ML model typically is to minimize a loss function or maximize a reward function.

The training data can be a subset of a larger data set. For example, a data set may be split into three mutually exclusive subsets: a training set, a validation (or cross-validation) set, and a testing set. The three subsets of data may be used sequentially during ML model training. For example, the training set may be first used to train one or more ML models, each ML model, e.g., having a particular architecture, having a particular training procedure, being describable by a set of model hyperparameters, and/or otherwise being varied from the other of the one or more ML models. The validation (or cross-validation) set may then be used as input data into the trained ML models to, e.g., measure the performance of the trained ML models and/or compare performance between them. Where hyperparameters are used, a new set of hyperparameters can be determined based on the measured performance of one or more of the trained ML models, and the first step of training (e.g., with the training set) may begin again on a different ML model described by the new set of determined hyperparameters. In this way, these steps can be repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) may begin. The output generated from the testing set may be compared with the corresponding desired target values to give a final assessment of the trained ML model's accuracy. Other segmentations of the larger data set and/or schemes for using the segments for training one or more ML models are possible.

Backpropagation is an algorithm for training an ML model. Backpropagation is used to adjust (e.g., update) the value of the parameters in the ML model, with the goal of optimizing the objective function. For example, a defined loss function is calculated by forward propagation of an input to obtain an output of the ML model and a comparison of the output value with the target value. Backpropagation calculates a gradient of the loss function with respect to the parameters of the ML model, and a gradient algorithm (e.g., gradient descent) is used to update (e.g., "learn") the parameters to reduce the loss function. Backpropagation is performed iteratively so that the loss function is converged or minimized. Other techniques for learning the parameters of the ML model can be used. The process of updating (or learning) the parameters over many iterations is referred to as training. Training may be carried out iteratively until a convergence condition is met (e.g., a predefined maximum number of iterations has been performed, or the value outputted by the ML model is sufficiently converged with the desired target value), after which the ML model is considered to be sufficiently trained. The values of the learned parameters can then be fixed and the ML model may be deployed to generate output in real-world applications (also referred to as "inference").

In some examples, a trained ML model may be fine-tuned, meaning that the values of the learned parameters may be adjusted slightly in order for the ML model to better model a specific task. Fine-tuning of an ML model typically involves further training the ML model on a number of data samples (which may be smaller in number/cardinality than those used to train the model initially) that closely target the specific task. For example, an ML model for generating natural language that has been trained generically on publicly available text corpora may be, e.g., fine-tuned by further training using specific training samples. The specific training samples can be used to generate language in a certain style or in a certain format. For example, the ML model can be trained to generate a blog post having a particular style and structure with a given topic.

Some concepts in ML-based language models are now discussed. It may be noted that, while the term "language model" has been commonly used to refer to an ML-based language model, there could exist non-ML language models. In the present disclosure, the term "language model" can refer to an ML-based language model (e.g., a language model that is implemented using a neural network or other ML architecture), unless stated otherwise. For example, unless stated otherwise, the "language model" encompasses large language models (LLMs).

A language model can use a neural network (typically a DNN) to perform natural language processing (NLP) tasks. A language model can be trained to model how words relate to each other in a textual sequence, based on probabilities. A language model may contain hundreds of thousands of learned parameters or, in the case of an LLM, can contain millions or billions of learned parameters or more. As non-limiting examples, a language model can generate text, translate text, summarize text, answer questions, write code (e.g., Python, JavaScript, or other programming languages), classify text (e.g., to identify spam emails), create content for various purposes (e.g., social media content, factual content, or marketing content), or create personalized content for a particular individual or group of individuals. Language models can also be used for chatbots (e.g., virtual assistance).

A type of neural network architecture, referred to as a "transformer," can be used for language models. For example, the Bidirectional Encoder Representations from Transformers (BERT) model, the Transformer-XL model, and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any ML-based language model, including language models based on other neural network architectures such as RNN-based language models.

Figure 2:
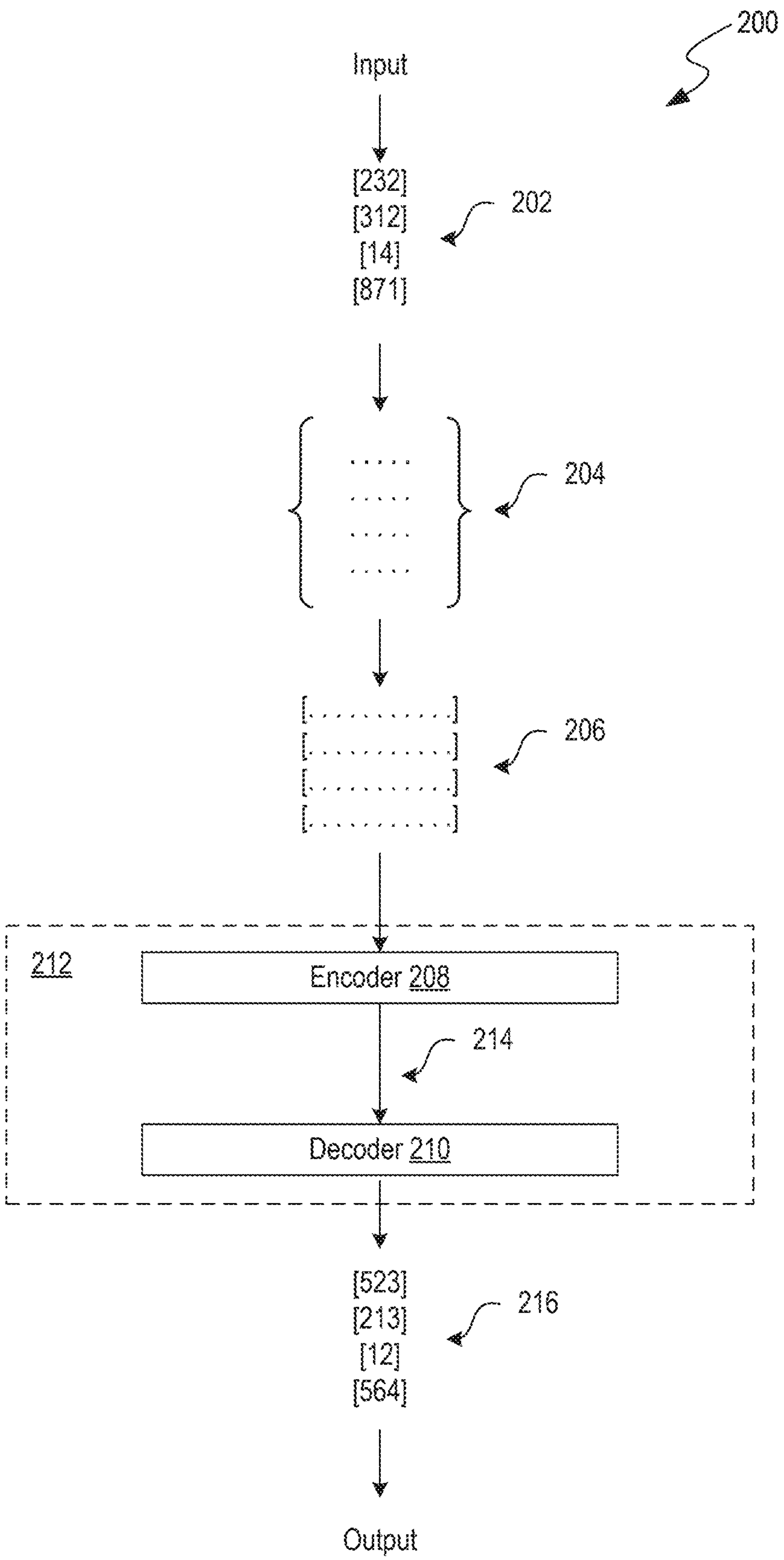
FIG. 2 is a block diagram of a transformer neural network, which may be used in examples of the present disclosure.

FIG. 2 is a block diagram 200 of an example transformer 212. A transformer is a type of neural network architecture that uses self-attention mechanisms to generate predicted output based on input data that has some sequential meaning (e.g., the order of the input data is meaningful, which is the case for most text input). Self-attention is a mechanism that relates different positions of a single sequence to compute a representation of the same sequence. Although transformer-based language models are described herein, the present disclosure may be applicable to any ML-based language model, including language models based on other neural network architectures such as RNN-based language models.

The transformer 212 includes an encoder 208 (which can include one or more encoder layers/blocks connected in series) and a decoder 210 (which can include one or more decoder layers/blocks connected in series). Generally, the encoder 208 and the decoder 210 each include multiple neural network layers, at least one of which can be a self-attention layer. The parameters of the neural network layers can be referred to as the parameters of the language model.

The transformer 212 can be trained to perform certain functions on a natural language input. Examples of the functions include summarizing existing content, brainstorming ideas, writing a rough draft, fixing spelling and grammar, and translating content. Summarizing can include extracting key points or themes from an existing content in a high-level summary. Brainstorming ideas can include generating a list of ideas based on provided input. For example, the ML model can generate a list of names for a startup or costumes for an upcoming party. Writing a rough draft can include generating writing in a particular style that could be useful as a starting point for the user's writing. The style can be identified as, e.g., an email, a blog post, a social media post, or a poem. Fixing spelling and grammar can include correcting errors in an existing input text. Translating can include converting an existing input text into a variety of different languages. In some implementations, the transformer 212 is trained to perform certain functions on other input formats than natural language input. For example, the input can include objects, images, audio content, or video content, or a combination thereof.

The transformer 212 can be trained on a text corpus that is labeled (e.g., annotated to indicate verbs, nouns) or unlabeled. LLMs can be trained on a large unlabeled corpus. The term "language model," as used herein, can include an ML-based language model (e.g., a language model that is implemented using a neural network or other ML architecture), unless stated otherwise. Some LLMs can be trained on a large multi-language, multi-domain corpus to enable the model to be versatile at a variety of language-based tasks such as generative tasks (e.g., generating human-like natural language responses to natural language input).

FIG. 2 illustrates an example of how the transformer 212 can process textual input data. Input to a language model (whether transformer-based or otherwise) typically is in the form of natural language that can be parsed into tokens. The term "token" in the context of language models and NLP has a different meaning from the use of the same term in other contexts such as data security. Tokenization, in the context of language models and NLP, refers to the process of parsing textual input (e.g., a character, a word, a phrase, a sentence, a paragraph) into a sequence of shorter segments that are converted to numerical representations referred to as tokens (or "compute tokens"). Typically, a token can be an integer that corresponds to the index of a text segment (e.g., a word) in a vocabulary dataset. Often, the vocabulary dataset is arranged by frequency of use. Commonly occurring text, such as punctuation, can have a lower vocabulary index in the dataset and thus be represented by a token having a smaller integer value than less commonly occurring text. Tokens frequently correspond to words, with or without white space appended. In some implementations, a token can correspond to a portion of a word.

For example, the word "greater" can be represented by a token for [great] and a second token for [er]. In another example, the text sequence "write a summary" can be parsed into the segments [write], [a], and [summary], each of which can be represented by a respective numerical token. In addition to tokens that are parsed from the textual sequence (e.g., tokens that correspond to words and punctuation), there can also be special tokens to encode non-textual information. For example, a [CLASS] token can be a special token that corresponds to a classification of the textual sequence (e.g., can classify the textual sequence as a list, a paragraph), an [EOT] token can be another special token that indicates the end of the textual sequence, other tokens can provide formatting information, etc.

In FIG. 2, a short sequence of tokens 202 corresponding to the input text is illustrated as input to the transformer 212. Tokenization of the text sequence into the tokens 202 can be performed by some pre-processing tokenization module such as, for example, a byte-pair encoding tokenizer (the "pre" referring to the tokenization occurring prior to the processing of the tokenized input by the LLM), which is not shown in FIG. 2 for brevity. In general, the token sequence that is inputted to the transformer 212 can be of any length up to a maximum length defined based on the dimensions of the transformer 212. Each token 202 in the token sequence is converted into an embedding vector 206 (also referred to as "embedding 206").

An embedding 206 is a learned numerical representation (such as, for example, a vector) of a token that captures some semantic meaning of the text segment represented by the token 202. The embedding 206 represents the text segment corresponding to the token 202 in a way such that embeddings corresponding to semantically related text are closer to each other in a vector space than embeddings corresponding to semantically unrelated text. For example, assuming that the words "write," "a," and "summary" each correspond to, respectively, a "write" token, an "a" token, and a "summary" token when tokenized, the embedding 206 corresponding to the "write" token will be closer to another embedding corresponding to the "jot down" token in the vector space as compared to the distance between the embedding 206 corresponding to the "write" token and another embedding corresponding to the "summary" token.

The vector space can be defined by the dimensions and values of the embedding vectors. Various techniques can be used to convert a token 202 to an embedding 206. For example, another trained ML model can be used to convert the token 202 into an embedding 206. In particular, another trained ML model can be used to convert the token 202 into an embedding 206 in a way that encodes additional information into the embedding 206 (e.g., a trained ML model can encode positional information about the position of the token 202 in the text sequence into the embedding 206). In some implementations, the numerical value of the token 202 can be used to look up the corresponding embedding in an embedding matrix 204, which can be learned during training of the transformer 212.

The generated embeddings 206 are input into the encoder 208. The encoder 208 serves to encode the embeddings 206 into feature vectors 214 that represent the latent features of the embeddings 206. The encoder 208 can encode positional information (i.e., information about the sequence of the input) in the feature vectors 214. The feature vectors 214 can have very high dimensionality (e.g., on the order of thousands or tens of thousands), with each element in a feature vector 214 corresponding to a respective feature. The numerical weight of each element in a feature vector 214 represents the importance of the corresponding feature. The space of all possible feature vectors 214 that can be generated by the encoder 208 can be referred to as a latent space or feature space.

Conceptually, the decoder 210 is designed to map the features represented by the feature vectors 214 into meaningful output, which can depend on the task that was assigned to the transformer 212. For example, if the transformer 212 is used for a translation task, the decoder 210 can map the feature vectors 214 into text output in a target language different from the language of the original tokens 202. Generally, in a generative language model, the decoder 210 serves to decode the feature vectors 214 into a sequence of tokens. The decoder 210 can generate output tokens 216 one by one. Each output token 216 can be fed back as input to the decoder 210 in order to generate the next output token 216. By feeding back the generated output and applying self-attention, the decoder 210 can generate a sequence of output tokens 216 that has sequential meaning (e.g., the resulting output text sequence is understandable as a sentence and obeys grammatical rules). The decoder 210 can generate output tokens 216 until a special [EOT] token (indicating the end of the text) is generated. The resulting sequence of output tokens 216 can then be converted to a text sequence in post-processing. For example, each output token 216 can be an integer number that corresponds to a vocabulary index. By looking up the text segment using the vocabulary index, the text segment corresponding to each output token 216 can be retrieved, the text segments can be concatenated together, and the final output text sequence can be obtained.

In some implementations, the input provided to the transformer 212 includes instructions to perform a function on an existing text. The output can include, for example, a modified version of the input text and instructions to modify the text. The modification can include summarizing, translating, correcting grammar or spelling, changing the style of the input text, lengthening or shortening the text, or changing the format of the text (e.g., adding bullet points or checkboxes). As an example, the input text can include meeting notes prepared by a user and the output can include a high-level summary of the meeting notes. In other examples, the input provided to the transformer includes a question or a request to generate text. The output can include a response to the question, text associated with the request, or a list of ideas associated with the request. For example, the input can include the question "What is the weather like in San Francisco?" and the output can include a description of the weather in San Francisco. As another example, the input can include a request to brainstorm names for a flower shop and the output can include a list of relevant names.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that can be considered to be an encoder-only language model. A decoder-only language model accepts embeddings as input and can use auto-regression to generate an output text sequence. Transformer-XL and GPT-type models can be language models that are considered to be decoder-only language models.

Because GPT-type language models tend to have a large number of parameters, these language models can be considered LLMs. An example of a GPT-type LLM is GPT-3. GPT-3 is a type of GPT language model that has been trained (in an unsupervised manner) on a large corpus derived from documents available online to the public. GPT-3 has a very large number of learned parameters (on the order of hundreds of billions), can accept a large number of tokens as input (e.g., up to 2,048 input tokens), and is able to generate a large number of tokens as output (e.g., up to 2,048 tokens). GPT-3 has been trained as a generative model, meaning that it can process input text sequences to predictively generate a meaningful output text sequence. ChatGPT is built on top of a GPT-type LLM and has been fine-tuned with training datasets based on text-based chats (e.g., chatbot conversations). ChatGPT is designed for processing natural language, receiving chat-like inputs, and generating chat-like outputs.

A computer system can access a remote language model (e.g., a cloud-based language model), such as ChatGPT or GPT-3, via a software interface (e.g., an API). Additionally or alternatively, such a remote language model can be accessed via a network such as the internet. In some implementations, such as, for example, potentially in the case of a cloud-based language model, a remote language model can be hosted by a computer system that can include a plurality of cooperating (e.g., cooperating via a network) computer systems that can be in, for example, a distributed arrangement. Notably, a remote language model can employ multiple processors (e.g., hardware processors such as, for example, processors of cooperating computer systems). Indeed, processing of inputs by an LLM can be computationally expensive/can involve a large number of operations (e.g., many instructions can be executed/large data structures can be accessed from memory), and providing output in a required timeframe (e.g., real time or near real time) can require the use of a plurality of processors/cooperating computing devices as discussed above.

Inputs to an LLM can be referred to as a prompt, which is a natural language input that includes instructions to the LLM to generate a desired output. A computer system can generate a prompt that is provided as input to the LLM via an API (e.g., the API 128 in FIG. 1). As described above, the prompt can optionally be processed or pre-processed into a token sequence prior to being provided as input to the LLM via its API. A prompt can include one or more examples of the desired output, which provides the LLM with additional information to enable the LLM to generate output according to the desired output. Additionally or alternatively, the examples included in a prompt can provide inputs (e.g., example inputs) corresponding to/as can be expected to result in the desired outputs provided. A one-shot prompt refers to a prompt that includes one example, and a few-shot prompt refers to a prompt that includes multiple examples. A prompt that includes no examples can be referred to as a zero-shot prompt.

Hierarchical Organizational Blocks in a Workspace

Figure 3:
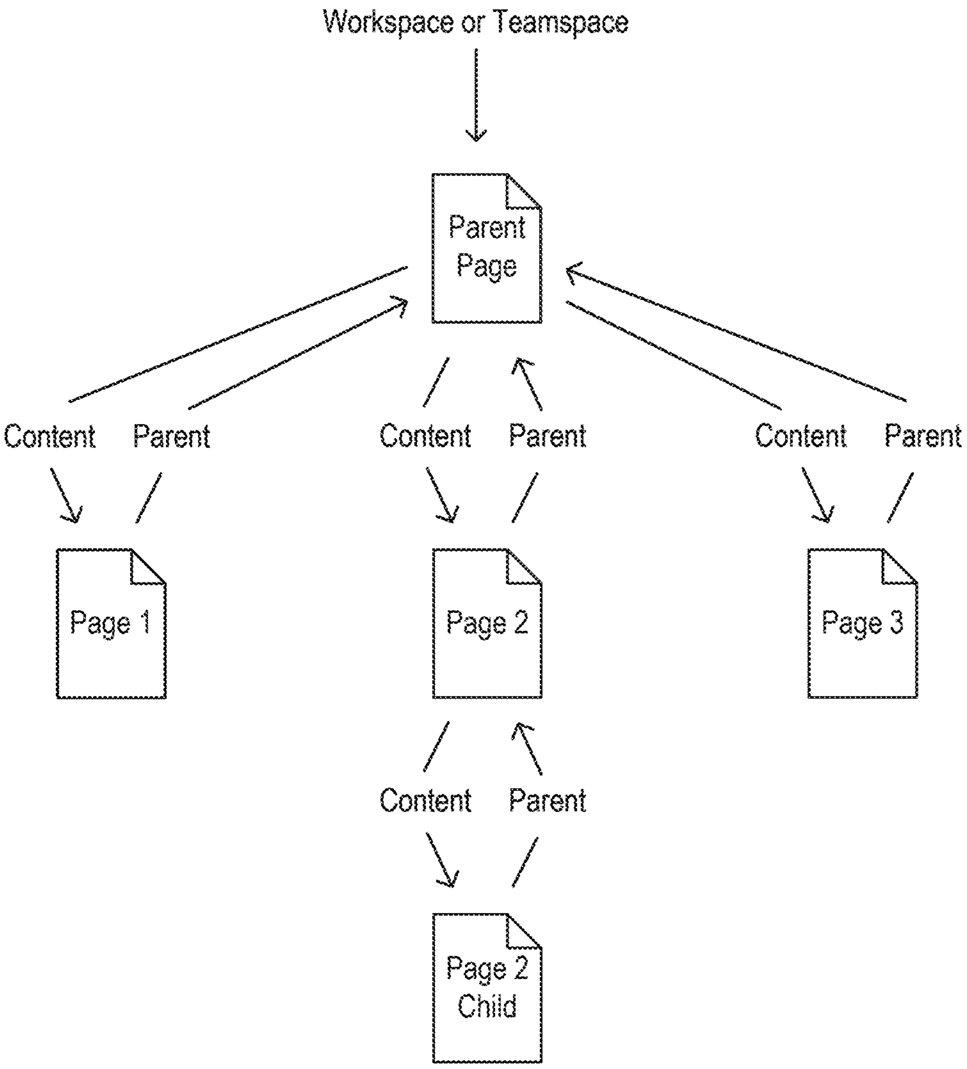
FIG. 3 is a block diagram illustrating a hierarchical organization of pages in a workspace.

FIG. 3 is a block diagram illustrating a hierarchical organization of pages in a workspace. As described with respect to the block data model of the present technology, a workspace can include multiple pages (e.g., page blocks). The pages (e.g., including parent pages and child or nested pages) can be arranged hierarchically within the workspace or one or more teamspaces, as shown in FIG. 3. The page can include a block such as tabs, lists, images, tables, etc.

A teamspace can refer to a collaborative space associated with a team or an organization that is hierarchically below a workspace. For example, a workspace can include a teamspace accessible by all users of an organization and multiple teamspaces that are accessible by users of different teams. Accessibility generally refers to creating, editing, and/or viewing content (e.g., pages) included in the workspace or the one or more teamspaces.

In the hierarchical organization illustrated in FIG. 3, a parent page (e.g., "Parent Page") is located hierarchically below the workspace or a teamspace. The parent page includes three children pages (e.g., "Page 1," "Page 2," and "Page 3"). Each of the child pages can further include sub-pages (e.g., "Page 2 Child," which is a grandchild of "Parent Page" and child of "Page 2"). The "Content" arrows in FIG. 3 indicate the relationship between the parents and children while the "Parent" arrows indicate the inheritance of access permissions. The child pages inherit access permission from the (immediate) parent page under which they are located hierarchically (e.g., which is above them in the tree). For example, "Page 2" inherited the access permission of the "Parent Page" as a default when it was created under its parent page. Similarly, "Page 2 Child" inherited the access permission of the parent page as a default when it was created under its parent page. "Parent Page," "Page 2," and "Page 2 Child" thereby have the same access permission within the workspace.

The relationships and organization of the content can be modified by changing the location of the pages. For example, when a child page is moved to be under a different parent, the child page's access permission modifies to correspond to the access permission of the new parent. Also, when the access permission of "Parent Page" is modified, the access permission of "Page 1," "Page 2," and "Page 3" can be automatically modified to correspond to the access permission of "Parent Page" based on the inheritance character of access permissions.

In contrast, however, a user can modify the access permission of the children independently of their parents. For example, the user can modify the access permission of "Page 2 Child" in FIG. 3 so that it is different from the access permission of "Page 2" and "Parent Page." The access permission of "Page 2 Child" can be modified to be broader or narrower than the access permission of its parents. As an example, "Page 2 Child" can be shared on the internet while "Page 2" is only shared internally to the users associated with the workspace. As another example, "Page 2 Child" can be shared only with an individual user while "Page 2" is shared with a group of users (e.g., a team of the organization associated with the workspace). In some implementations, the hierarchical inheritance of the access permissions described herein can be modified from the previous description. For example, the access permissions of all the pages (parent and children) can be defined as independently changeable.

Example Mail Block Suggestion System

Figure 4:
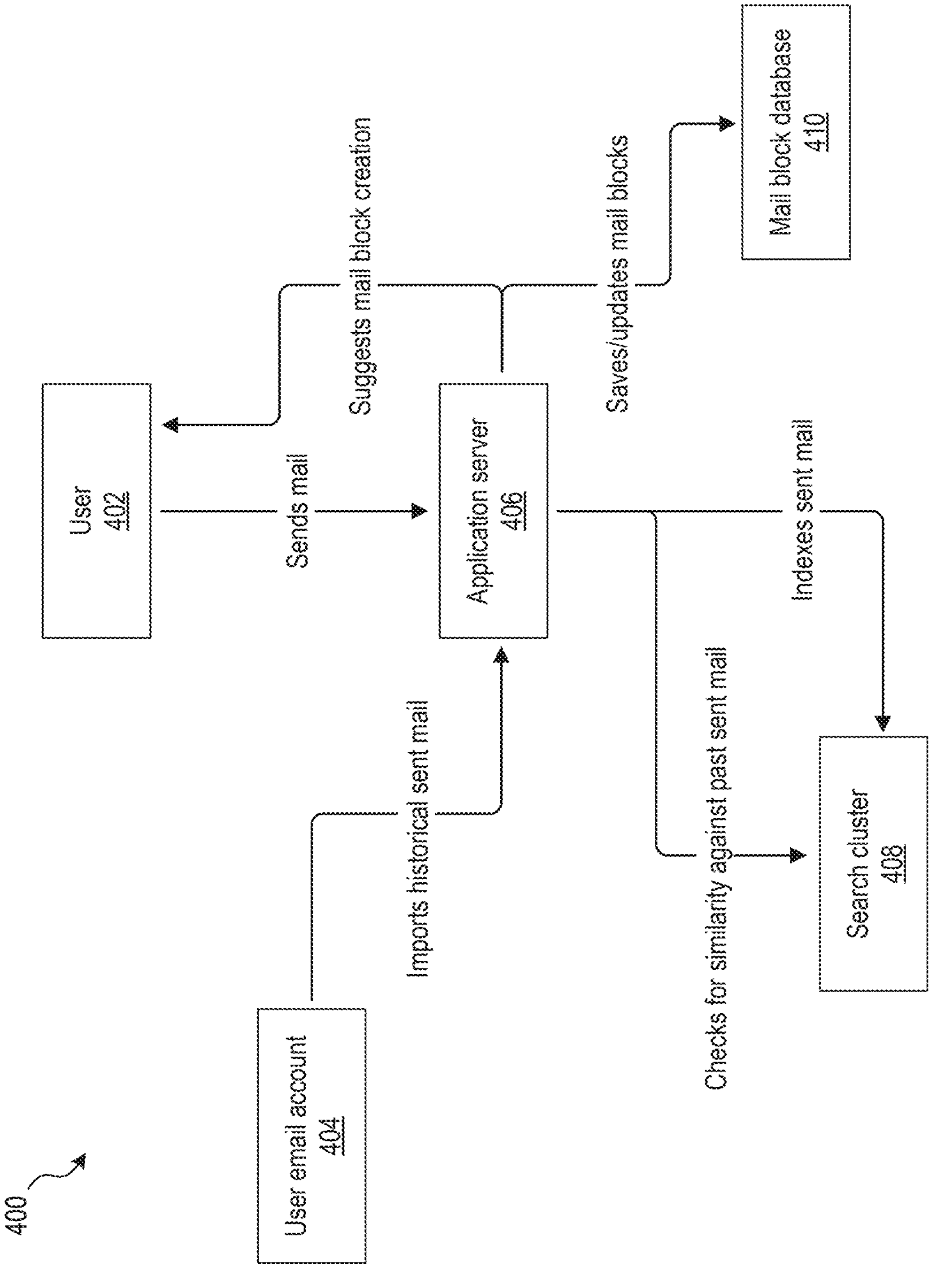
FIG. 4 is an example mail block suggestion system for storing mail blocks in a database and suggesting relevant mail blocks during email creation.

FIG. 4 is an example mail block suggestion system 400 for storing mail blocks in a database and suggesting relevant mail blocks during email creation. In some embodiments, as depicted in FIG. 4, the mail block suggestion system 400 includes a user 402, a user email account 404, an application server 406, a search cluster 408, and a mail block database 410. The mail block suggestion system 400 may be implemented using the computer system illustrated and described in more detail with reference to FIG. 8. Likewise, implementations of the mail block suggestion system 400 can include different and/or additional components or can be connected in different ways.

The user 402 is an individual or entity controlling the user email account 404. The user email account 404 stores emails addressed to the user 402 and allows the user 402 to send emails to other email accounts. For example, the user email account 404 may be an account managed by the provider of the application server 406 or an external email provider (e.g., Gmail) not associated with the application server 406.

The application server 406 imports historical sent emails stored in the user email account 404 and stores them in an email database where semantically similar or otherwise related emails are grouped together. For example, the application server 406 may record at least a subject (e.g., the subject line associated with an email) and body text (e.g., the body content of an email) for each imported email into the email database, which stores those records for later access by the application server 406.

In some embodiments, as depicted in FIG. 4, the email database is a search cluster 408. A search cluster 408 is a semantic index (e.g., an OpenSearch cluster) in which imported emails are labeled based on their semantic meaning and which can be queried to retrieve emails based on those semantic meanings rather than the literal text of the emails. For example, an email may be indexed within the search cluster 408 by generating a first vector embedding of the email (e.g., using a transformer 212 or other ML model), which is a conversion of the semantic meaning of the email into a numerical vector representing that meaning. Continuing with the same example, the first vector embedding may be stored in a vector database containing a plurality of vector embeddings and compared to a second vector embedding from the vector database representing a second email (e.g., an email previously imported by the application server 406). In some embodiments, comparing the first and second vectors may include calculating a similarity score between the vectors using cosine similarity between the embeddings of the two vectors or another method of calculating similarity between numerical vectors. In such embodiments, the emails represented by the first and second vectors may be grouped together within the search cluster 408 when the calculated similarity score satisfies a predetermined threshold for semantic similarity (e.g., meeting or exceeding a numerical threshold determined by an application developer).

Indexing the imported emails in the search cluster 408 enables similar/related information to be indexed in the same location and labels the content of emails more accurately than other indexing approaches. Thus, indexing in the search cluster 408 reduces the amount of computational resources required to retrieve email-related information in the future and reduces the likelihood that computational resources will be spent on retrieving irrelevant information due to inaccurate labeling.

In some embodiments, the application server 406 may recognize a recurring pattern of text within emails that are grouped together in the email database. For example, recognizing a pattern may include recognizing that a plurality of emails within a group contain the same string of words and/or contain strings of words with a similar semantic meaning. Continuing with the same example, this recognition may be performed by receiving an indication from a language model or other ML model of a recurring pattern, the language model or other ML model being implemented within the application server 406 or being external to but in communication with the application server 406 (e.g., via an API). In these and other embodiments, the application server 406 may generate a mail block based on the recurring pattern of text. A mail block is a block of text or other content that is generally reusable across many emails having a similar subject matter or purpose (e.g., a block of text the user 402 would type repeatedly when manually composing different emails). For example, the mail block may be generated based on an indication received from a language model or other ML model (e.g., implemented by or in communication with the application server 406) that uses an NLP technique such as tokenization, stop-word removal, and/or lemmatization to generate the indication. Continuing with the same example, the generated mail block may include generalized text representing the recurring pattern (e.g., having the same or a similar semantic meaning). Because mail blocks are generated based on a recurring pattern of text in similar emails, the relevancy to future emails of a similar nature is improved over existing email generation and/or autofill tools, which may simply generate text probabilistically based on previous text in an email and/or generate text based on less selective categorizations of previous email content than the present technology.

In some embodiments, the application server 406 may recognize a recurring pattern of mentioned entities (e.g., individuals, dates, times, or organizations) and/or text segments that fulfill a generally similar purpose across emails but include content specific to the context of an individual email (e.g., action items, summary points highlighting salient information from a meeting or document) within a group of emails. For example, the recurring pattern may be recognized based on named entity recognition (NER) models (e.g., from libraries like spaCy or Stanford NLP) implemented within the application server 406 and/or external to but in communication with the application server 406 (e.g., via an API). In such embodiments, the application server 406 may generate a mail block based on a recurring pattern of text in the emails in the group and including a placeholder (e.g., text such as "{Name}," "{Date}," or "{Company}") where the name of a specific entity of the indicated type may be inserted. Such a mail block, which may be referred to as a "template," includes a block of text that is generally reusable across many emails but requires certain parts of the text to be customized for each particular email being sent. For example, a user 402 may repeatedly send emails containing lists of action items, but the relevant action items themselves may differ from email to email. In such an example, a template containing text related to action items but having placeholders for action items instead of pre-written action items themselves may be generated in relation to the user 402. Templates are described in more detail in relation to FIG. 6 below.

In some embodiments, as depicted in FIG. 4, the application server 406 saves and/or updates created mail blocks in a mail block database 410. For example, the mail block database 410 may be a database that stores mail blocks for access by a user 402 when the user 402 is composing a new email. Continuing with the same example, each mail block in the mail block database 410 may have associated permissions (e.g., determined using role-based access control (RBAC)) determining a set of users 402 permitted to access the mail block. In some embodiments, a user 402 may request access to a mail block in the mail block database 410 and the application server 406 may determine whether the user has permission to access the mail block based on the permissions associated with the mail block. In such embodiments, a user 402 with permission to access a mail block may be able to access a copy of the mail block and/or a customized version of the mail block (e.g., a variant of the mail block customized by the accessing user 402) and insert that block into an email being composed by the user 402. Additionally or alternatively, a user 402 with access to a mail block may be able to update the mail block (e.g., modify the content of the mail block and upload the modified version to the mail block database 410), which may cause the application server 406 to record the update in a version history associated with the mail block (e.g., a list of current and previous versions of the mail block). In such embodiments, the application server 406 may notify (e.g., via email or push notification) a set of users with access to the mail block that the mail block has been updated.

In some embodiments, the mail block database 410 operates analogously to the search cluster 408, grouping mail blocks stored within the mail block database 410 based on determinations that vector embeddings of those mail blocks meet or exceed a predetermined threshold for semantic similarity. For example, a mail block may be indexed within the mail block database 410 by generating a first vector embedding of the mail block as described above in relation to emails indexed in the search cluster 408. Continuing with the same example, the first vector embedding may be stored in the vector database and compared to a second vector embedding from the vector database representing a second mail block. In some embodiments, comparing the first and second vectors may include calculating a similarity score between the vectors as described above in relation to the search cluster 408.

In some embodiments, as depicted in FIG. 4, the application server 406 suggests the insertion of a mail block from the mail block database 410 into an email composer to the user 402. For example, the application server 406 may monitor text input (e.g., via keystroke monitoring) by a user 402 into an email composer (e.g., a UI within an email client for inputting the content of an email) for similarities (e.g., textual or semantic similarities) between the text input and a mail block in the mail block database 410. In such embodiments, a similarity may be detected and, in response, the application server 406 may suggest insertion of the mail block into the email composer to the user 402. In other embodiments, insertion of a mail block may be suggested before the user begins composing an email by analyzing related emails (e.g., previous emails in an email chain) for similarities between the content of those emails and a mail block in the mail block database 410. In embodiments where this suggestion is accepted, the mail block may be inserted into the email composer, thereby allowing the user 402 to more efficiently compose an email without manually searching for a relevant mail block or manually entering the text included in the mail block. Additionally, insertion of a mail block provides a user composing an email with more text to use for email composition at once than existing email composition aids, which typically do not suggest more than a few words at a time for insertion. Thus, suggestion and insertion of a mail block can provide larger amounts of text than existing composition aids while executing fewer suggestion operations.

In some embodiments, an indication received from the user 402 that the suggestion is accepted or declined may cause the application server 406 to update the predetermined threshold for semantic similarity used in grouping emails in the search cluster 408 and/or mail blocks in the mail block database 410. Thus, the application server 406 may base the future grouping of emails and/or mail blocks at least in part on the frequency with which users find a mail block suitable for certain email contexts. Doing so allows the application server 406 to adjust to user preferences over time and become more accurate in generating and suggesting relevant mail blocks.

In some embodiments, the user 402 may indicate that a modification to a suggested mail block should be made. In such embodiments, the application server 406 may insert a version of the mail block including the indicated modification into the email composer and/or store the modified version of the mail block in the mail block database 410. In some embodiments where a modified mail block is stored in the mail block database 410, the application server 406 may record the modification in a version history (e.g., a list of previous and current versions of a mail block) associated with the mail block.

In some embodiments, a relevance score is associated with a mail block created by the application server 406. The relevance score influences the probability that the application server 406 will suggest usage of a mail block, with higher relevance scores resulting in an increased likelihood of suggestion. For example, when a suggestion of a mail block is accepted by a user 402, the relevance score associated with the mail block may be increased, and when a suggestion of the mail block is declined, the relevance score associated with the mail block may be decreased. As another example, when a user modifies a suggested mail block before the mail block is inserted into an email composer, a relevance score associated with the unmodified version of the mail block may be decreased. Thus, mail blocks that are used more frequently by users 402 will have higher relevance scores and be suggested more often, reflecting the increased likelihood that a user 402 will want to use the mail block as compared to other, less frequently used, mail blocks. In some embodiments, the relevance score associated with a mail block may be specific to a particular user 402, thereby reflecting the mail block preferences of the specific user 402 rather than users of the application server 406 in general. Associating a relevance score with a mail block improves computational efficiency of the mail block suggestion system 400, as it increases the relevance of suggestions made by the application server 406, reducing the likelihood that the application server 406 will spend computational resources on making repeated suggestions before a mail block suggestion is accepted by the user 402.

Example User Interfaces for Inserting Mail Blocks

Figure 5:
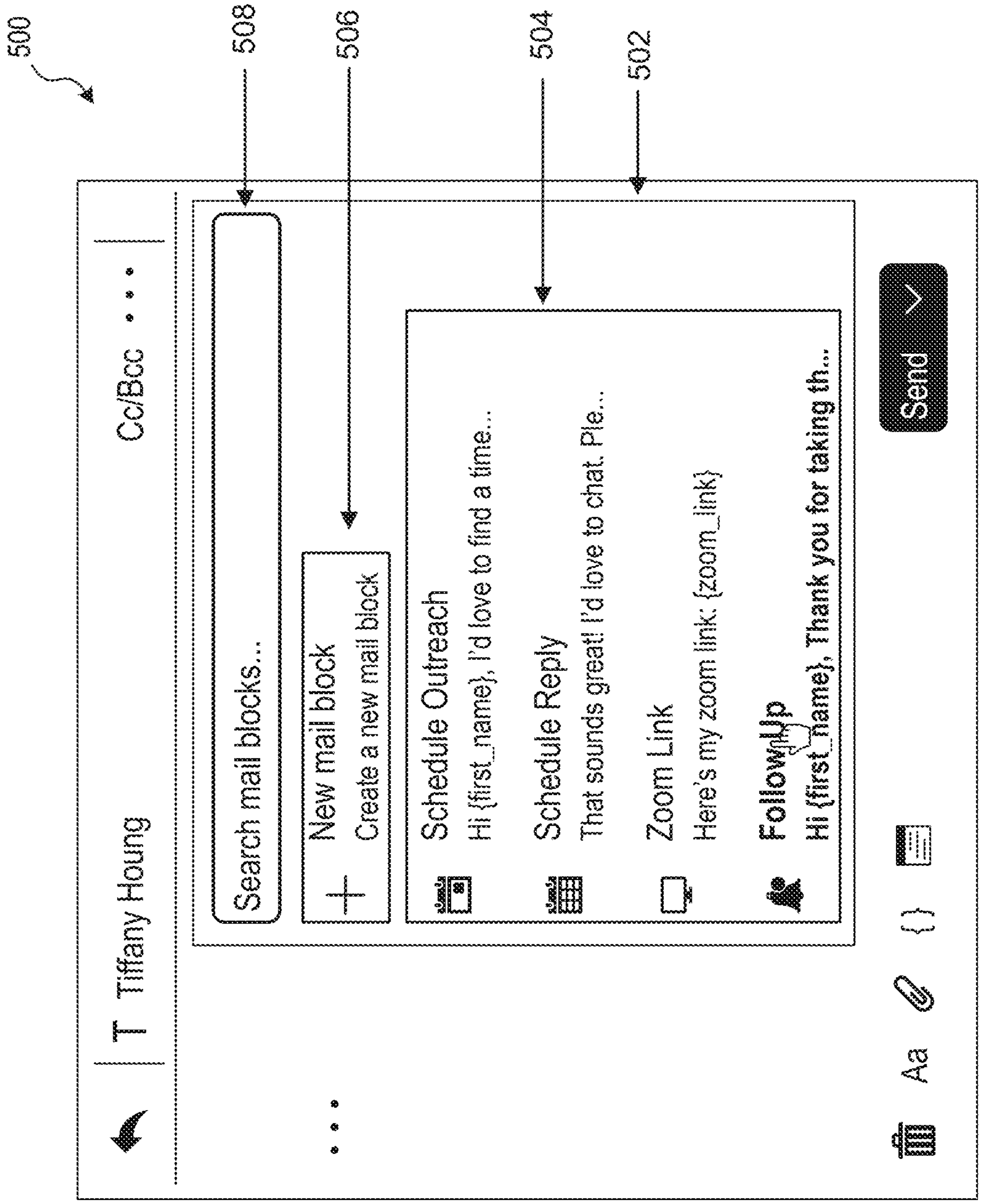
FIG. 5 is an illustration of an example mail block search interface within an email composer.

FIG. 5 is an illustration of an example email composer 500 including a mail block search interface 502. A mail block search interface 502 is a user interface for displaying mail blocks to a user of an email application. For example, as depicted in FIG. 5, the mail block search interface 502 may appear within the email composer 500 and allow a user to view and/or search for available mail blocks to insert into an email being composed by the user. In some embodiments, also as depicted in FIG. 5, the mail block search interface 502 includes a list of mail blocks 504, a new mail block indicator 506, and a search bar 508.

The list of mail blocks 504 includes one or more mail blocks, which may be selected by a user (e.g., by clicking with a mouse cursor) and inserted into the email composer 500 in response to being selected. In some embodiments, the mail blocks in the list of mail blocks 504 are stored in a mail block database 410 as described in relation to FIG. 4 above and/or may only include mail blocks a particular user is permitted to access according to the permissions associated with each mail block. In some embodiments, as depicted in FIG. 5, each mail block in the list of mail blocks 504 may be associated with a specific type of email and/or be displayed along with an indication of a particular type of email. For example, the first mail block in the list of mail blocks 504 in FIG. 5 is associated with "Schedule Outreach" and an indication of this association is displayed in text and with a calendar icon.

The new mail block indicator 506 is an object that may be selected by a user and, when selected, prompts the user to create a new mail block. For example, selection of the new mail block indicator 506 may cause the display of a user interface including a text box where the user may enter the text of a new mail block. Continuing with the same example, the entered text may then be saved as a mail block in a mail block database 410 as described in relation to FIG. 4 above. In some embodiments, after a new mail block is created via selection of the new mail block indicator 506, the mail block may appear in the list of mail blocks 504.

The search bar 508 is a user interface element allowing a user to input a search query into the mail block search interface 502. For example, the search query may be a natural language text input indicating that the user wishes to retrieve a mail block having a desired semantic meaning indicated by the text input. In response to receiving such a search query, the mail block search interface 502 may include a mail block having a semantic meaning matching the desired semantic meaning in the list of mail blocks 504 and/or display the matching mail block via another user interface element. In some embodiments, whether the semantic meaning of a mail block matches the semantic meaning of a search query may be determined using a similar process to the process for grouping mail blocks together in a mail block database 410 described in relation to FIG. 4 above, except that one vector embedding may represent the search query rather than a mail block. In such embodiments, the predetermined threshold used to determine a match may be the same predetermined threshold used for grouping mail blocks or another predetermined numerical value.

Figure 6:
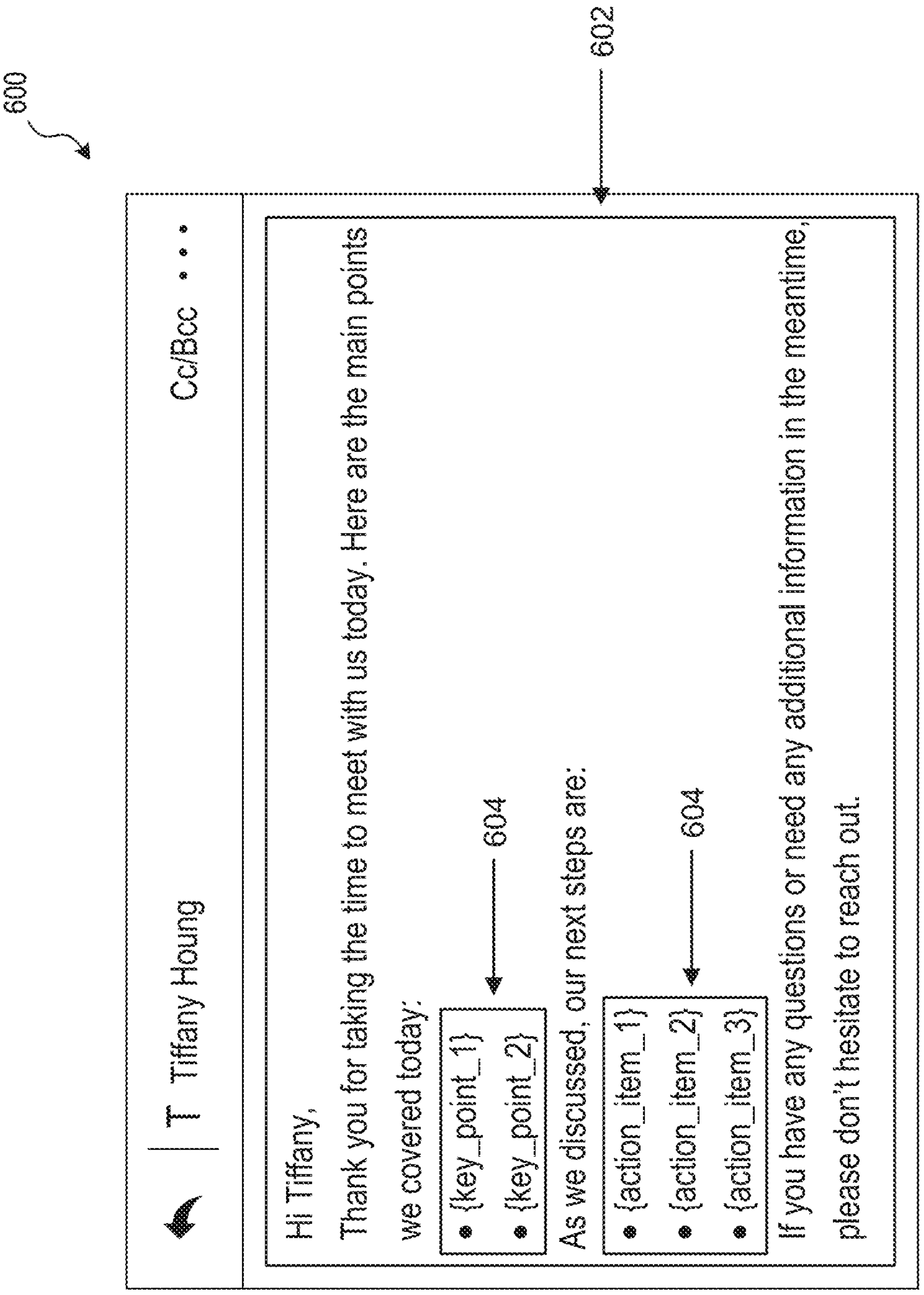
FIG. 6 is an illustration of an example email composer after insertion of a template.

FIG. 6 is an illustration of an example email composer 600 after insertion of a template 602. A template 602 is a type of mail block including a block of text that is generally reusable across many emails but requires certain parts of the text to be customized for each particular email being sent. In some embodiments, the template 602 may include the additional features of templates described in relation to FIG. 4 above and/or may be inserted into the email composer 600 after being selected from a list of mail blocks 504 in a mail block search interface 502, as described in relation to FIG.

5 above. For example, the template 602 depicted in FIG. 6 includes a list of summary points and action items. Because the summary points and action items that may be relevant for a user to include in an email may vary depending on the context of the email, the template 602 does not include pre-written summary points or action items but instead includes placeholders 604 ("{key_point_1}" and "{key_point_2}" for summary points, "{action_item_1}," "{action_item_2}," and "{action_item_3}" for action items) in locations where such text may be included.

In some embodiments, specific mentioned entities and/or specific text segments may be extracted from an email thread (e.g., a group of associated emails including consecutive replies to an initial email) and automatically populated within the appropriate placeholder 604 in the template 602. For example, the summary point and action item placeholders 604 in FIG. 6 may be automatically populated using text from the body of emails in the email thread and/or attachments to those emails comprising summaries of or action items related to the content therein. In these and other embodiments, the placeholders 604 in a template 602 may additionally be populated using another source of information, such as an address book or company contact database. In such embodiments, the relevant information to insert into the placeholders 604 may be identified by a language model or other ML model. By automatically filling in templates 602 with contextually appropriate information, users are enabled to compose emails more efficiently and without the need for manually locating information to include, saving time and reducing the probability of human error involving the inclusion of inaccurate or inappropriate information.

Example Method of Mail Block Suggestion

Figure 7:
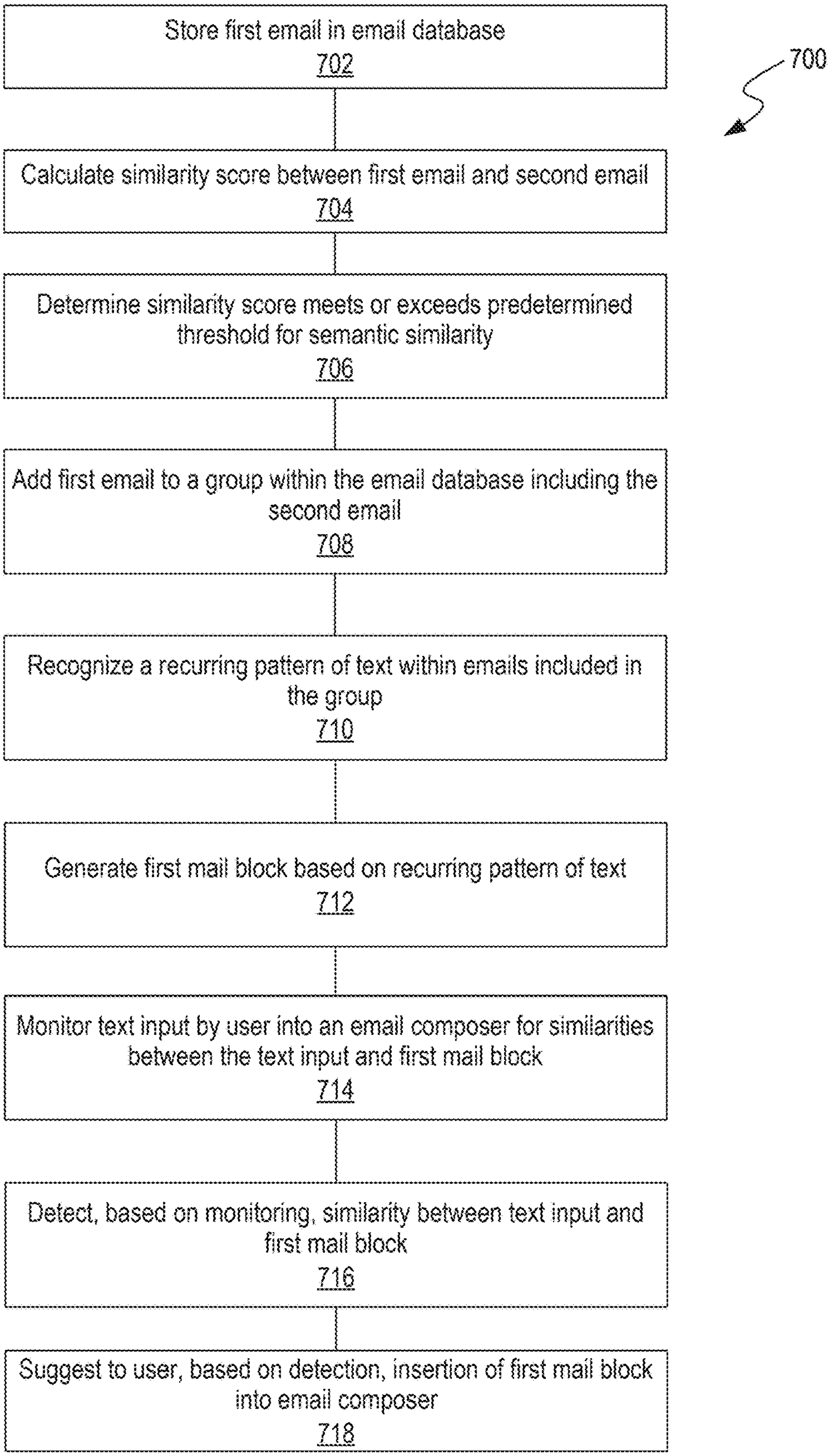
FIG. 7 is a flow diagram illustrating an example method of suggesting insertion of a mail block into an email composer to a user.

FIG. 7 is a flow diagram illustrating an example method 700 of suggesting insertion of a mail block into an email composer to a user. In operation 702, a first email is stored in an email database. For example, the email database may be a search cluster 408 as described in relation to FIG. 4 above and/or storing the email may include recording at least a subject (e.g., the associated subject line) and body text (e.g., the body content) for the email in the email database.

In operation 704, a similarity score between the first email and a second email is calculated. In some embodiments, the similarity score is calculated in the same or a generally similar manner to the manner described in relation to FIG. 4 above. In operation 706, a determination that this similarity score meets or exceeds a predetermined threshold for semantic similarity is made. Likewise, the predetermined threshold may be the same or generally similar to the predetermined threshold as described in relation to FIG. 4. In operation 708, the first email is added to a group within the email database including the second email. Thus, emails containing similar/related information and/or semantic content may be grouped together in the email database.

In operation 710, a recurring pattern of text within emails included in the group is recognized. In some embodiments, recognizing the recurring pattern may include recognizing that a plurality of emails within a group contain the same string of words and/or contain strings of words with a similar semantic meaning. In these and other embodiments, the recognition of a recurring pattern may be performed by receiving an indication from a language model or other ML model as described in relation to FIG. 4 above.

In operation 712, a first mail block is generated based on the recurring pattern of text. In some embodiments, the first mail block is the same or generally similar to the mail block described in relation to FIG. 4 above and is generated in the same or a generally similar manner.

In operation 714, text input by a user into an email composer is monitored for similarities between the text input and the first mail block. For example, the text input may be monitored (e.g., via keystroke monitoring) for textual and/or semantic similarity to the first mail block as the user composes an email. In operation 716, a similarity between the text input and the first mail block is detected based on the monitoring. For example, a similarity may be detected based on an identification that text which is identical to text included in the mail block is being input into the email composer. As another example, a similarity may be detected based on an identification that the text input is semantically similar to the first mail block, as determined by a comparison between vector embeddings of the text input and the first mail block and/or another method for determining semantic similarity.

In operation 718, a suggestion of insertion of the first mail block into the email composer is made to the user based on the detection. For example, the suggestion may include displaying the first mail block in a mail block search interface 502 as described in relation to FIG. 5 above and/or displaying the first mail block in another user interface element within the email composer. Thus, the user is automatically presented with a mail block that is relevant to the content of the email being composed, reducing the need for the user to manually draft an entire email or manually search for a relevant mail block to insert into an email. In some embodiments, the suggested mail block is inserted into the email composer in response to an indication that the user has accepted the suggestion of the mail block.

Computer System

Figure 8:
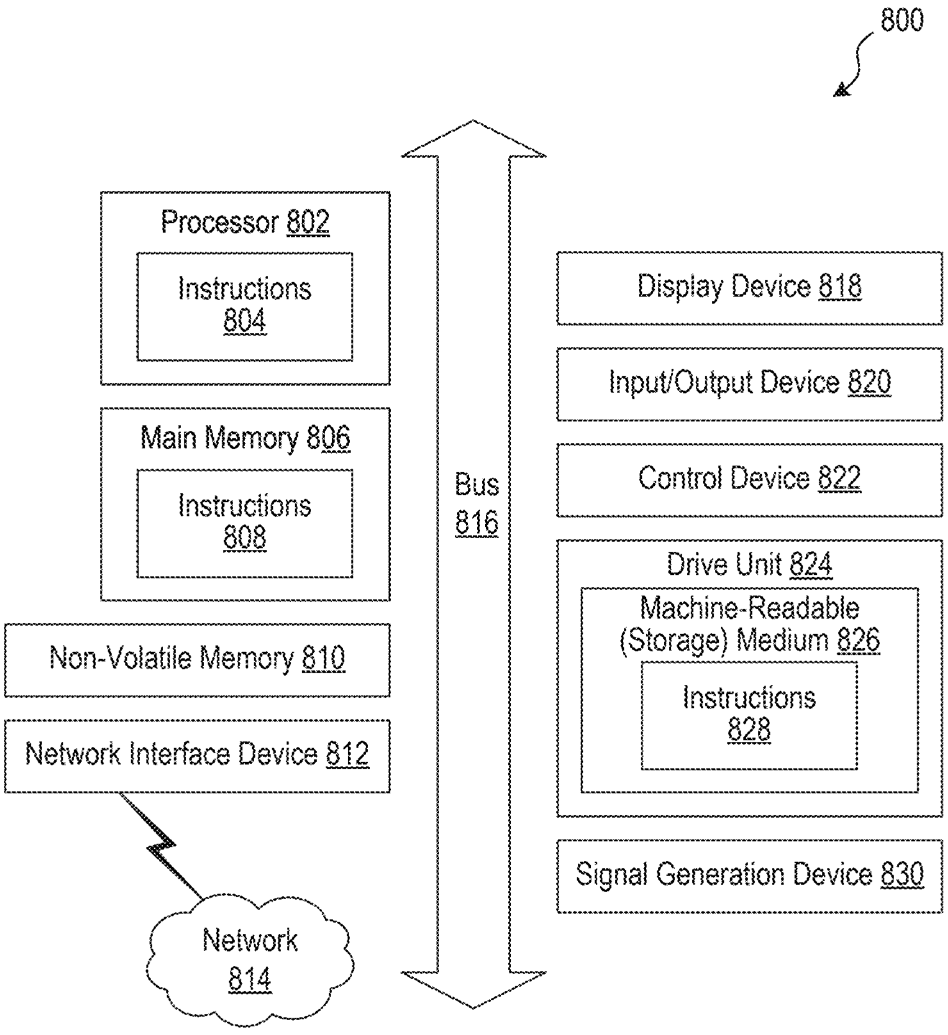
FIG. 8 is a block diagram that illustrates an example of a computer system in which at least some operations described herein can be implemented.

FIG. 8 is a block diagram that illustrates an example of a computer system 800 in which at least some operations described herein can be implemented. As shown, the computer system 800 can include: one or more processors 802, main memory 806, non-volatile memory 810, a network interface device 812, a display device 818, an input/output device 820, a control device 822 (e.g., keyboard and pointing device), a drive unit 824 that includes a machine-readable (storage) medium 826, and a signal generation device 830 that are communicatively connected to a bus 816. The bus 816 represents one or more physical buses and/or point-to-point connections that are connected by appropriate bridges, adapters, or controllers. Various common components (e.g., cache memory) are omitted from FIG. 8 for brevity. Instead, the computer system 800 is intended to illustrate a hardware device on which components illustrated or described relative to the examples of the figures and any other components described in this specification can be implemented.

The computer system 800 can take any suitable physical form. For example, the computer system 800 can share a similar architecture as that of a server computer, personal computer (PC), tablet computer, mobile telephone, wearable electronic device, network-connected ("smart") device (e.g., a television or home assistant device), augmented reality/virtual reality (AR/VR) system (e.g., head-mounted display), or any electronic device capable of executing a set of instructions that specify action(s) to be taken by the computer system 800. In some implementations, the computer system 800 can be an embedded computer system, a system-on-chip (SOC), a single-board computer (SBC) system, or a distributed system such as a mesh of computer systems or include one or more cloud components in one or more networks. Where appropriate, one or more computer systems 800 can perform operations in real time, near real time, or in batch mode.

The network interface device 812 enables the computer system 800 to mediate data in a network 814 with an entity that is external to the computer system 800 through any communication protocol supported by the computer system 800 and the external entity. Examples of the network interface device 812 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 806, non-volatile memory 810, machine-readable medium 826) can be local, remote, or distributed. Although shown as a single medium, the machine-readable medium 826 can include multiple media (e.g., a centralized/distributed database and/or associated caches and servers) that store one or more sets of instructions 828. The machine-readable medium 826 can include any medium that is capable of storing, encoding, or carrying a set of instructions for execution by the computer system 800. The machine-readable medium 826 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 810, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 804, 808, 828) set at various times in various memory and storage devices in computing device(s). When read and executed by the processor 802, the instruction(s) cause the computer system 800 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," or any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the Detailed Description above using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the Detailed Description above explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words “means for.” However, the use of the term “for” in any other context is not intended to invoke a similar interpretation. The applicant reserves the right to pursue such additional claim forms either in this application or in a continuing application.

The invention claimed is:

1. A non-transitory, computer-readable storage medium comprising instructions recorded thereon, wherein the instructions, when executed by at least one data processor of a system, cause the system to:

store a first email sent by a first user in an email database, wherein said storing includes recording a subject of the first email and body text of the first email;

generate a first vector embedding associated with the first email, wherein the first vector embedding represents a semantic meaning of the first email;

store the first vector embedding in a vector database containing a plurality of vector embeddings;

calculate a similarity score between the first vector embedding and a second vector embedding from the vector database, wherein the second vector embedding represents a semantic meaning of a second email stored in the email database, and wherein the similarity score is calculated at least in part by using cosine similarity;

determine that the similarity score meets or exceeds a predetermined threshold for semantic similarity;

in response to said determining, add the first email to a group within the email database, wherein the group includes the second email;

recognize a recurring pattern of text within emails included in the group;

generate, based on the recurring pattern of text, a first mail block, wherein the first mail block includes generalized text representing the recurring pattern of text;

store the first mail block in a mail block database, wherein permissions associated with each mail block in the mail block database determine a set of users with access to each mail block, and wherein the permissions are determined using role-based access control;

generate a third vector embedding associated with the first mail block, wherein the third vector embedding represents a semantic meaning of the first mail block;

store the third vector embedding in the vector database;

calculate a second similarity score between the third vector embedding and a fourth vector embedding, wherein the fourth vector embedding represents a semantic meaning of a second mail block stored in the mail block database, and wherein the similarity score is calculated at least in part by using cosine similarity;

determine that the second similarity score meets or exceeds the predetermined threshold for semantic similarity;

in response to said determining, add the first mail block to a group within the mail block database, wherein the group includes the first mail block and the second mail block;

monitor text input by the first user into an email composer for similarities between the text input and the first mail block;

detect, based on said monitoring, a similarity between the text input and the first mail block, wherein the similarity is either semantic similarity or textual similarity;

suggest to the first user, based on said detection, insertion of the first mail block into the email composer;

in response to an indication from the first user accepting said suggestion of insertion of the first mail block, insert the first mail block into the email composer and increase a relevance score associated with the first mail block;

in response to an indication from the first user declining said suggestion of insertion of the first mail block, decrease a relevance score associated with the first mail block; and update the predetermined threshold for semantic similarity based on the indication received from the first user.

2. The non-transitory, computer-readable storage medium of claim 1, further comprising instructions to:

recognize a recurring pattern of mentioned entities or text segments within the group, wherein the mentioned entities include at least one of an individual, a date, a time, or an organization, and wherein the text segments include at least one of an action item or a summary point;

generate, based on the recurring pattern of text, a second mail block, wherein the second mail block includes a placeholder for inserting specific mentioned entities or text segments;

extract a specific mentioned entity or a specific text segment from an email thread;

insert the second mail block into the email composer while the first user is composing a new email in the email thread; and automatically populate the placeholder included in the second mail block with the extracted specific mentioned entity or the extracted specific text segment.

3. The non-transitory, computer-readable storage medium of claim 1, further comprising instructions to:

cause display of a list of mail blocks via a mail block search interface;

receive a selection from the first user of one of the mail blocks from the list of mail blocks; and in response to said selection, insert the selected mail block into the email composer.

4. The non-transitory, computer-readable storage medium of claim 3, further comprising instructions to:

receive a search query from the first user via the mail block search interface, wherein the search query is a natural language text input indicating a desired semantic meaning of a mail block; and include in the list of mail blocks a plurality of mail blocks having a semantic meaning matching the desired semantic meaning.

5. The non-transitory, computer-readable storage medium of claim 1, further comprising instructions to:

in response to an indication from the first user modifying the first mail block after the first mail block is suggested:

insert the modified mail block into the email composer;

store the modified mail block in the mail block database; and decrease a relevance score associated with the first mail block.

6. The non-transitory, computer-readable storage medium of claim 1, further comprising instructions to:

receive a request from a second user to access the first mail block from the mail block database;

determine the second user has permission to access the first mail block based on permissions associated with the first mail block;

provide the second user with at least one of a copy of the first mail block or a customized version of the first mail block, wherein the customized version of the first mail block is customized by the second user;

receive an update to the first mail block from the second user;

record the update in a version history associated with the first mail block; and notify the set of users with access to the first mail block of the update.

7. A system comprising:

at least one hardware processor; and at least one non-transitory memory storing instructions, which, when executed by the at least one hardware processor, cause the system to:

store a first email in an email database;

calculate a similarity score between the first email and a second email, wherein the similarity score is based on semantic similarities between the first email and the second email;

determine that the similarity score meets or exceeds a predetermined threshold for semantic similarity;

in response to said determining, add the first email to a group within the email database, wherein the group includes the second email;

recognize a recurring pattern of text within emails included in the group;

generate, based on the recurring pattern of text, a first mail block, wherein the first mail block includes generalized text representing the recurring pattern of text;

monitor text input by a user into an email composer for similarities between the text input and the first mail block;

detect, based on said monitoring, a similarity between the text input and the first mail block, wherein the similarity is either semantic similarity or textual similarity; and suggest to the user, based on said detection, insertion of the first mail block into the email composer.

8. The system of claim 7, further comprising instructions to:

in response to an indication from the user accepting said suggestion of insertion of the first mail block, insert the first mail block into the email composer and increase a relevance score associated with the first mail block; and in response to an indication from the user declining said suggestion of insertion of the first mail block, decrease a relevance score associated with the first mail block.

9. The system of claim 8, further comprising instructions to:

update the predetermined threshold for semantic similarity based on the indication received from the user.

10. The system of claim 7, further comprising instructions to:

generate a first vector embedding associated with the first email, wherein the first vector embedding represents a semantic meaning of the first email;

store the first vector embedding in a vector database containing a plurality of vector embeddings; and calculate the similarity score based on the first vector embedding and a second vector embedding from the vector database, wherein the second vector embedding represents a semantic meaning of a second email stored in the email database.

11. The system of claim 7, further comprising instructions to:

store the first mail block in a mail block database, wherein permissions associated with each mail block in the mail block database determine a set of users with access to each mail block;

generate a first vector embedding associated with the first mail block, wherein the first vector embedding represents a semantic meaning of the first mail block;

store the first vector embedding in a vector database containing a plurality of vector embeddings;

calculate a second similarity score between the first vector embedding and a second vector embedding, wherein the second vector embedding represents a semantic meaning of a second mail block stored in the mail block database;

determine that the second similarity score meets or exceeds the predetermined threshold for semantic similarity; and in response to said determining, add the first mail block to a group within the mail block database, wherein the group includes the first mail block and the second mail block.

12. The system of claim 7, further comprising instructions to:

recognize a recurring pattern of mentioned entities or text segments within the group, wherein the mentioned entities include at least one of an individual, a date, a time, or an organization, and wherein the text segments include at least one of an action item or a summary point;

generate, based on the recurring pattern of text, a second mail block, wherein the second mail block includes a placeholder for inserting specific mentioned entities or text segments;

extract a specific mentioned entity or a specific text segment from an email thread;

insert the second mail block into the email composer while the user is composing a new email in the email thread; and automatically populate the placeholder included in the second mail block with the extracted specific mentioned entity or the extracted specific text segment.

13. The system of claim 7, further comprising instructions to:

cause display of a list of mail blocks via a mail block search interface;

receive a selection from the user of one of the mail blocks from the list of mail blocks; and in response to said selection, insert the selected mail block into the email composer.

14. The system of claim 13, further comprising instructions to:

receive a search query from the user via the mail block search interface, wherein the search query is a natural language text input indicating a desired semantic meaning of a mail block; and include in the list of mail blocks a plurality of mail blocks having a semantic meaning matching the desired semantic meaning.

15. The system of claim 7, further comprising instructions to:

in response to an indication from the user modifying the first mail block after the first mail block is suggested:

insert the modified mail block into the email composer;

store the modified mail block in the mail block database; and decrease a relevance score associated with the first mail block.

16. A method comprising:

storing a first email in an email database;

calculating a similarity score between the first email and a second email, wherein the similarity score is based on semantic similarities between the first email and the second email;

determining that the similarity score meets or exceeds a predetermined threshold for semantic similarity;

in response to said determining, adding the first email to a group within the email database, wherein the group includes the second email;

recognizing a recurring pattern of text within emails included in the group;

generating, based on the recurring pattern of text, a first mail block, wherein the first mail block includes generalized text representing the recurring pattern of text;

monitoring text input by a user into an email composer for similarities between the text input and the first mail block;

detecting, based on said monitoring, a similarity between the text input and the first mail block, wherein the similarity is either semantic similarity or textual similarity; and suggesting to the user, based on said detection, insertion of the first mail block into the email composer.

17. The method of claim 16, further comprising:

in response to an indication from the user accepting said suggestion of insertion of the first mail block, inserting the first mail block into the email composer and increasing a relevance score associated with the first mail block.

18. The method of claim 16, further comprising:

in response to an indication from the user declining said suggestion of insertion of the first mail block, decreasing a relevance score associated with the first mail block.

19. The method of claim 16, further comprising:

in response to an indication from the user modifying the first mail block after the first mail block is suggested:

inserting the modified mail block into the email composer;

storing the modified mail block in the mail block database; and decreasing a relevance score associated with the first mail block.

20. The method of claim 16, further comprising:

recognizing a recurring pattern of mentioned entities or text segments within the group, wherein the mentioned entities include at least one of an individual, a date, a time, or an organization, and wherein the text segments include at least one of an action item or a summary point;

generating, based on the recurring pattern of text, a second mail block, wherein the second mail block includes a placeholder for inserting specific mentioned entities or text segments;

extracting a specific mentioned entity or a specific text segment from an email thread;

inserting the second mail block into the email composer while the user is composing a new email in the email thread; and automatically populating the placeholder included in the second mail block with the extracted specific mentioned entity or the extracted specific text segment.

* * * * *